United States Patent [19]

Friedland

[11] 4,189,947
[45] Feb. 26, 1980

[54] NUTATION DAMPER FOR TWO-AXIS GYROSCOPE

[75] Inventor: Bernard Friedland, West Orange, N.J.

[73] Assignee: The Singer Company, Little Falls, N.J.

[21] Appl. No.: 850,940

[22] Filed: Nov. 14, 1977

[51] Int. Cl.² .................................. G01C 19/04
[52] U.S. Cl. ................................. 74/5.5; 74/5.4
[58] Field of Search ..................... 74/5 R, 5.5, 5.4

[56] References Cited

U.S. PATENT DOCUMENTS

| 3,075,393 | 1/1963 | Lingren | 74/5.5 X |
| 3,577,646 | 5/1971 | Eklund | 74/5.5 X |
| 3,591,108 | 7/1971 | Perkel et al. | 74/5.5 X |
| 3,608,383 | 9/1971 | Hunter et al. | 74/5.5 X |
| 3,954,024 | 5/1976 | Staats | 74/5.5 |

FOREIGN PATENT DOCUMENTS 2007836  9/1970  Fed. Rep. of Germany ............. 74/5.5

Primary Examiner—Rodney H. Bonck
Attorney, Agent, or Firm—T. W. Kennedy

[57] ABSTRACT

An electrical circuit interposed between the pickoffs and torquers of a two-axis gyroscope. The circuit output controls the torquers. When the pickoff signals vary at the nutation frequency, the angular accelerations produced by the torquers damp the nutation. No angular accelerations are produced when the pickoff signals are not varying and only negligible angular accelerations are produced when the pickoff signals vary at a frequency other than the nutation frequency.

8 Claims, 2 Drawing Figures

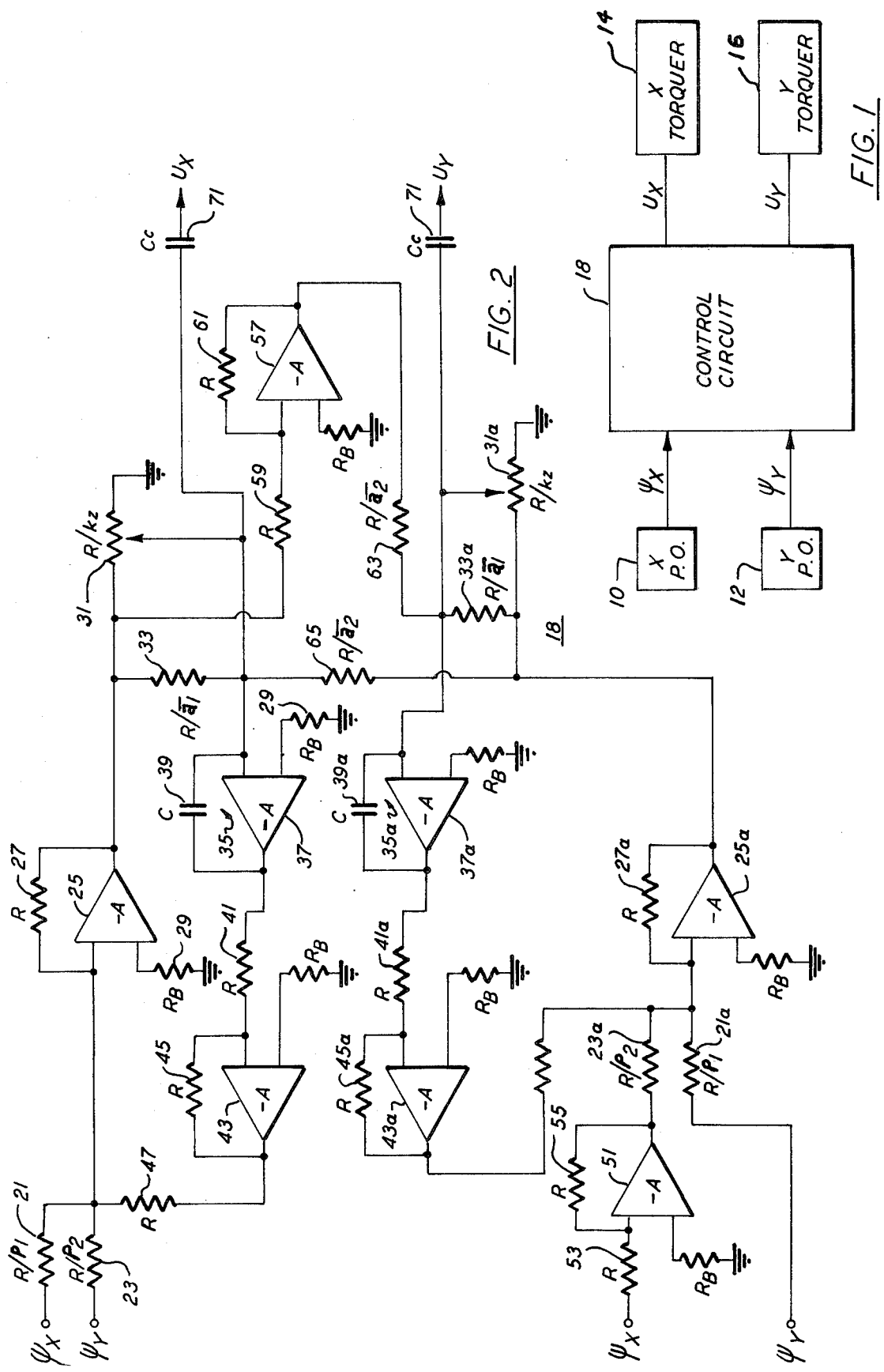

NUTATION DAMPER FOR TWO-AXIS GYROSCOPE

BACKGROUND OF THE INVENTION

1. Field of the Invention

This invention relates generally to a gyroscope having means to dampen the oscillation of the rotor axis and particularly to a nutation damper for a two-axis gyroscope.

2. Description of the Prior Art

Undesirable nutation can be excited in a two-axis gyroscope. Generally this nutation results from an input at the nutation frequency, but it can also result from an input at a frequency equal to twice the speed of rotation of the rotor minus the nutation frequency.

The only currently known method of reducing the amplitude of nutation caused by various inputs is by changing the mechanical design and construction of the gyroscope. This method of nutation damping suffers from serious defects.

SUMMARY OF THE INVENTION

It is therefore an object of the invention to provide a nutation damper for a two-axis gyroscope which is continuously operating. It is also an object of the invention to provide a nutation damper for a two-axis gyroscope which suppresses undesirable nutation irrespective of the source of excitation of the nutation.

These and other objects of the invention are achieved in a two-axis gyroscope which has mutually perpendicular first and second reference axes and a rotor with a spin axis. The gyroscope includes a first pickoff which produces a first pickoff signal whose magnitude is proportional to the angle the rotor spin axis makes with respect to the first reference axis, a second pickoff which produces a second pickoff signal whose magnitude is proportional to the angle the rotor spin axis makes with respect to the second reference axis, a first torquer for producing angular accelerations of the rotor about the first reference axis, and a second torquer for producing angular accelerations of the rotor about the second reference axis. The gyroscope also includes control means for producing first and second pickoff signals which control the amount of angular acceleration produced by the first and second torquers, respectively. The improvement of the invention comprises the control means including damping means for stably damping variations in the magnitudes of the first and second pickoff signals occurring at the nutation frequency. The damping means use the first and second pickoff signals to produce torquer control signals which cause substantial angular accelerations only when the first and second pickoff signal variations occur at the nutation frequency. No angular accelerations are caused when there are no variations in the magnitudes of the first and second pickoff signals.

These and other features of the invention will be described in greater detail in the following detailed description.

BRIEF DESCRIPTION OF THE DRAWING

FIG. 1 is a block diagram of the system of the present invention;

FIG. 2 is a schematic illustration of a nutation damper for a two-axis gyroscope constructed in accordance with the invention.

DETAILED DESCRIPTION

Referring now to the drawing, there is shown, in schematic form, pickoffs 10 and 12, torquers 14 and 16, and control circuit 18. Pickoff 10 produces, in the known manner, a first pickoff signal $\psi_x$ proportional to the magnitude of the pickoff angle between the rotor spin axis and a first reference axis of a two-axis gyroscope, not shown. In like manner, pickoff 12 produces a second pickoff signal $\psi_y$ proportional to the magnitude of the pickoff angle between the rotor spin axis and a second reference axis, perpendicular to the first. The first and second reference signals pass into control circuit 18.

Control circuit 18 is an electrical network which has been designed to have the following transfer functions:

$$\frac{U_x(s)}{\psi_x(s)} = \frac{U_y(s)}{\psi_y(s)} = -\frac{k_2 s[p_1(s + k_z + \bar{a}_1) - p_2\bar{a}_2]}{(s + k_z + \bar{a}_1)^2 + \bar{a}_2^2}$$

$$\frac{U_y(s)}{\psi_x(s)} = -\frac{U_x(s)}{\psi_y(s)} = -\frac{k_2 s[-p_2(s + k_z + \bar{a}_1) + p_1\bar{a}_2]}{(s + k_z + \bar{a}_1)^2 + \bar{a}_2^2}$$

where $U_x$ is the angular acceleration of the rotor produced by torquer 16 about the first reference axis, $U_y$ is the angular acceleration of the rotor produced by the torquer 14 about the second reference axis, $\psi_x$ is the first pickoff signal, $\psi_y$ the second pickoff signal, and $$\bar{a} \approx 0 \quad \bar{a} = \omega_n(1 - \frac{1}{2F_m})$$

$$P_1 = \frac{d_Q}{1 - 1/(2F_m)} - d_I$$

$$P_2 = \frac{\delta N/F_m}{1 - 1/(2F_m)} - \frac{\omega_n}{2F_m}$$

in which
 $\omega_n = 2\pi f_n$ = nutation frequency in rad/sec.
 $F_m$ = gyro figure of merit
 $d_Q$ = quadrature damping
 $d_I$ = in-phase damping
 $\delta N$ = gyro detuning frequency
and
 $k_Z$ = the damper gain
 s = complex frequency This transfer function can be implemented in a number of ways. One simple way, well known in the art, is to use resistors, capacitors and operational amplifiers to perform the various operations. Specifically, a scaling amplifier can be formed from an operational amplifier with resistive feedback or, if the scale factor desired is positive but less than one, by tapping a single resistor. An integrator can be formed from an operational amplifier with capacitive feedback. And individual summers and sign-changing summers can be formed from one or more operational amplifiers and resistors arranged so that output of the proper sign is produced. Operational amplifiers can also be used in the circuit to provide the proper sign for the torquer inputs and to obtain the necessary gain from the circuit.

Of course, there are many other methods known in the arts for realizing these transfers functions. For example, they can also be realized using digital filter components.

FIG. 2 illustrates a possible implementation of the control circuit 18 for implementing the transfer function given above. The inputs $\psi_x$ and $\psi_y$ are coupled through resistors 21 and 23, respectively, having relative values $R/p_1$ and $R/p_2$) and inverting amplifier 25 with the resistor 27 of relative value R in its feedback path. The non-inverting input of the amplifier 25 is coupled to ground through a biasing resistor 29 of value $R_b$. The output of amplifier 25 is coupled to a variable resistor 31 having its other side coupled to ground. This output is also coupled through a fixed resistor 33 having a relative value $R/\bar{a}_1$. Both of these outputs are inputs to the inverting input of an integrator 35 made up of an amplifier 37 and feedback capacitor 39. This amplifier, as do all other amplifiers shown on the drawing, also has a d-c biasing resistor $R_b$ coupling it non-inverting input to ground. The output of the integrator 35 is coupled through a resistor 41 to the inverting input of an amplifier 43 having a feedback resistor 45. Both resistors 41 and 45 have relative values of R so that the amplifier 43 acts as a unity gain inverting amplifier. The output of this amplifier is summed at the inverting input of amplifier 25 with the inputs through resistors 21 and 23. The summing resistor 47 coupling it to the inverting input of amplifier 25 has a relative value R. The variable resistor $R/k_z$ permits adjusting the damper gain. As will be evident from examination of the figure, the circuit is basically symmetrical with one half having just been described. In order to further show this symmetry, portions in the second half of the circuit which perform the same function as those in the first half, will be given the same reference numeral with a designation a therebehind. Thus, the two input signals $\psi_x$ and $\psi_y$ are coupled through resistors 23a and 21a, after $\psi_x$ has first been inverted through a unity gain operational amplifier having an input resistor 53 and feedback resistor 55 of equal value. The inputs are, of course, also reversed with the $\psi_y$ input being coupled through the resistors $R/p_1$ and the $\psi_x$ through the resistor $R/p_2$ as required by the transfer function. The inputs are provided to amplifier 25a having a feedback resistor 27a. The output of this amplifier is coupled through resistor 33a to the input of an integrator 35a made up of amplifier 37a with capacitor 39a in its feedback path. As in the other half of the circuit, this output is also coupled into the potentiometer 31a having the relative value $R/k_z$ for setting the damper gain. As in the previous half of the circuit, the output of this potentiometer is an input of the integrator 35a. The integrator output is coupled through an inverting amplifier 43a having an input resistor 41a and feedback resistor 45a, the output of the amplifier being coupled through resistor 47a as an additional inverting input to amplifier 25a.

The two halves of the system are interconnected. Thus, the output from amplifier 25a, after inversion through an amplifier 57, having an input resistor 59 and feedback resistor 61 of equal value to give unity gain, is coupled through a resistor 63 of relative value $R/\bar{a}_2$ as an additional input to the integrator 35. The output $U_x$ is taken from the wiper of potentiometer 31 and the output $U_y$ from potentiometer 31a. In each case, the output is coupled through a coupling capacitor 71 to couple only a-c and block d-c components. This avoids gyro bias errors caused by d-c drifts in the electronics. The control circuit 18 has been designed so that its d-c transmission is theoretically zero so that when blocking capacitors are used, the dynamic characteristics of the damper are not altered.

Input 54 is multiplied by adjustable multiplier 52 by the scale factor $k_z$, the desired damper gain. The output of adjustable multiplier 52 provides the input for torquer 16, represented by arrow 104, and one of the three inputs, represented by arrow 102, of sign-changing summer 78. Likewise, input 66 is multiplied by adjustable multiplier 64 by the factor scale $k_z$. The output of adjustable multiplier 64 provides the input for torquer 14, represented by arrow 106, and one of the three inputs, represented by arrow 88, of sign-changing summer 76.

Input 58 of multiplier 56 is multiplied by the scale factor $\bar{a}_1$ and the output of multiplier 56 provides the second input, represented by arrow 100, of sign-changing summer 78. Likewise, input 70 of multiplier 68 is multiplied by the scale factor $\bar{a}_1$ and the output of multiplier 68 provides the second input, represented by arrow 86, of sign-changing 76.

Input 62 of multiplier 60 is multiplied by the scale factor $\bar{a}_2$ and the output of multiplier 60 provides the third input, represented by arrow 90, of sign-changing summer 76. Likewise, input 74 of multiplier 72 is multiplied by the scale factor $\bar{a}_2$ and the output of multiplier 72 provides the third input, represented by arrow 98, of sign-changing summer 78.

Sign-changing summer 78 sums the negatives of inputs 98, 100 and 102 to provide input 92 for integrator 80. Sign-changing summer 76 sums input 90 and the negatives of inputs 86 and 88 to provide input 84 for integrator 82. The output of integrator 80 provides the third input, represented by arrow 94, of summer 44 and completes one feedback loop. The output of integrator 82 provides the third input, represented by arrow 96, of sign-changing summer 50 and completes the second feedback loop. Sign-changing summer 50 sums inputs 46 and 96 and the negative of input 48.

Control circuit 18 permits the construction of a very simple nutation damper. Control circuit 18 also has negligible transmission at all frequencies from pickoffs 10 and 12 except for those in the vicinity of the nutation frequency and thus has negligible effect on the dynamic characteristics of the gyro. Just as importantly, nutation damper described above is a stable dynamic system for any finite value of damper gain $k_z$.

A major advantage of the nutation damper described above is that it suppresses nutation irrespective of the source. The damper is activated by oscillations at the nutation frequency irrespective of the cause of nutation.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. In a two-axis gyroscope having mutually perpendicular first and second reference axes, a rotor with a spin axis, a first pickoff which produces a first pickoff signal whose magnitude is proportional to the angle the rotor spin axis makes with respect to the first reference axis, a second pickoff which produces a second pickoff signal whose magnitude is proportional to the angle the rotor spin axis makes with respect to the second reference axis, a first torquer which produces angular accelerations of the rotor about the first reference axis, a second torquer which produces angular accelerations of the rotor about the second reference axis, and control means for producing first and second torquer control signals from the first and second pickoff signals which control the amount of angular accelerations produced by the first and second torquers, respectively, the improvement comprising: the control means including damping means for stably damping variations in the magnitudes of the first and second pickoff signals occurring at the nutation frequency which damping means use the first and second pickoff signals to produce torquer control signals which cause substantial angular accelerations only when the first and second pickoff signal variations occur at the nutation frequency and which cause no angular accelerations when there are no variations in the magnitudes of the first and second pickoff signals at the nutation frequency; and blocking capacitors disposed between said damping means and the first and second torquers.

2. The invention according to claim 1 and further includes means for adjusting amount of damping produced by the damping means.

3. The invention according to claim 1 wherein the damping means is an electrical network designed in accordance with prescribed transfer functions.

4. The invention according to claim 3 wherein the electrical network comprises:
(a) a first means coupled to the first pickoff for multiplying the first pickoff signal by a factor $p_1$;
(b) a second means coupled to the second pickoff for multiplying the second pickoff signal by a factor $p_2$;
(c) a first integrator;
(d) a third means coupled to the outputs of said first and second means, and to the output of a first integrator for summing said outputs;
(e) a fourth means coupled to the output of said third means for multiplying said output by a factor $\bar{a}_1$;
(f) a fifth means coupled to the output of said third means for multiplying said output by a factor $k_z$, the output of said fifth means providing the first torquer control signal;
(g) a sixth means coupled to the first pickoff for multiplying the first pickoff signal by the factor $p_1$;
(h) a seventh means coupled to the second pickoff for multiplying the second pickoff signal by the factor $p_2$;
(i) a second integrator;
(j) eighth means coupled to the outputs of said sixth and seventh means and to the output of said second integrator for summing the outputs of said sixth means, seventh means and second integrator;
(k) ninth means coupled to the output of said eighth means for multiplying the output by the factor $\bar{a}_1$;
(l) tenth means coupled to the output of the said eighth means for multiplying the output by the factor $k_z$, the output of said tenth means provided the second torquer control signal;
(m) eleventh means coupled to the output of said eighth means for multiplying the output by a factor $\bar{a}_2$;
(n) twelfth means coupled to the output of said third means for multiplying said output by a factor $\bar{a}_2$;
(o) thirteenth means coupled to the input of said first integrator for summing the outputs of said fourth, fifth and eleventh means; and (p) fourteenth means coupled to the input of said second integrator for summing outputs of said ninth, tenth and twelfth means.

5. The circuit of claim 4 wherein each of said means for multiplying are implemented using scaled operational amplifiers.

6. In a two-axis gyroscope having mutually perpendicular first and second reference axes, a rotor with a spin axis, a first pickoff which produces a first pickoff signal whose magnitude is proportional to the angle the rotor spin axis makes with respect to the first reference axis, a second pickoff which produces a second pickoff signal whose magnitude is proportional to the angle the rotor spin axis makes with respect to the second reference axis, a first torquer which produces angular accelerations of the rotor about the first reference axis, a second torquer which produces angular accelerations of the rotor about the second reference axis, and control means for producing first and second torquer control signals from the first and second pickoff signals which control the amount of angular accelerations produced by the first and second torquers, respectively, the improvement comprising: the control means including damping means for stably damping variations in the magnitudes of the first and second pickoff signals occurring at the nutation frequency which damping means use the first and second pickoff signals to produce torquer control signals which cause substantial angular accelerations only when the first and second pickoff signal variations occur at the nutation frequency and which cause no angular accelerations when there are no variations in the magnitudes of the first and second pickoff signals at the nutation frequency, said damping means comprising an electric network including:
(a) a first means coupled to the first pickoff for multiplying the first pickoff signal by a factor $p_1$;
(b) a second means coupled to the second pickoff for multiplying the second pickoff signal by a factor $p_2$;
(c) a first integrator;
(d) a third means coupled to the outputs of said first and second means, and to the output of a first integrator for summing said outputs;
(e) a fourth means coupled to the output of said third means for multiplying said output by a factor $\bar{a}_1$;
(f) a fifth means coupled to the output of said third means for multiplying said output by a factor $k_z$, the output of said fifth means providing the first torquer control signal;
(g) a sixth means coupled to the first pickoff for multiplying the first pickoff signal by the factor $p_1$;
(h) a seventh means coupled to the second pickoff for multiplying the second pickoff signal by the factor $p_2$;
(i) a second integrator;
(j) eighth means coupled to the outputs of said sixth and seventh means and to the output of said second integrator for summing the outputs of said sixth means, seventh means and second integrator;
(k) ninth means coupled to the output of said eighth means for multiplying the output by the factor $\bar{a}_1$;
(l) tenth means coupled to the output of the said eighth means for multiplying the output by the factor $k_z$, the output of said tenth means providing the second torquer control signal;
(m) eleventh means coupled to the output of said eighth means for multiplying the output by a factor $\bar{a}_2$;

(n) twelfth means coupled to the output of said third means for multiplying said output by a factor $\bar{a}_2$;

(o) thirteenth means coupled to the input of said first integrator for summing the outputs of said fourth, fifth and eleventh means; and (p) fourteenth means coupled to the input of said second integrator for summing outputs of said ninth, tenth and twelfth means.

7. The apparatus of claim 4 and further including capacitors coupling the outputs of said circuit to said torquers.

8. The circuit of claim 6 wherein each of said means for multiplying are implemented using scaled operational amplifiers.

* * * * *